United States Patent [19]

Joly et al.

[11] Patent Number: 5,420,279
[45] Date of Patent: May 30, 1995

[54] CRYSTALLISED MICROPOROUS GALLIUM PHOSPHATE AND ITS SUBSTITUTED DERIVATIVES AND A METHOD OF PREPARING THEM

[75] Inventors: Jean-Francois Joly, Paris; Adballah Merrouché, Mulhouse; Henri Kessler, Wittenheim; Jean-Louis guth, Mulhouse, all of France

[73] Assignee: Institut Francais du Petrole, France

[21] Appl. No.: 118,282

[22] Filed: Sep. 9, 1993

Related U.S. Application Data

[63] Continuation of Ser. No. 863,059, Apr. 19, 1992, abandoned.

[51] Int. Cl.$^6$ .................... C07D 295/02; C01B 25/45
[52] U.S. Cl. ........................ 546/10; 540/452; 540/541; 548/402; 423/305; 502/208
[58] Field of Search ................ 546/10; 540/452, 541; 548/402

[56] References Cited

U.S. PATENT DOCUMENTS 4,690,808   9/1987   Wilson ..................... 502/208

FOREIGN PATENT DOCUMENTS 158349   10/1985   European Pat. Off. .
158350   10/1985   European Pat. Off. .

*Primary Examiner*—Mark L. Berch
*Attorney, Agent, or Firm*—Antonelli, Terry, Stout & Kraus

[57] ABSTRACT

Microporous crystallized gallium phosphate and its substituted derivatives, characterized by:

a) the following approximate general formula:

$$R_r Ga_g P_p X_x O_2 F_f h H_2O$$

where the sum of g, p and x is equal to 1, and where
g is a number from 0.3 to 0.5,
p is a number from 0.3 to 0.52,
x is a number from 0 to 0.4,
r is a number from 0.01 to 0.2,
f is a number from 0.01 to 0.2,
h varies according to the degree of hydration of the solid, from 0 to 0.5.
R is an organic compound selected from the group formed by cyclic amines,
X is a heteroatom selected from the group formed by the elements: Li, Be, Co, Mg, Mn, Zn, Al, B, Cr, Fe, Ge, Si, Ti, As and V b) an X-ray diffraction diagram shown in Table 1 of the description, and a method of preparing them.

15 Claims, No Drawings

CRYSTALLISED MICROPOROUS GALLIUM PHOSPHATE AND ITS SUBSTITUTED DERIVATIVES AND A METHOD OF PREPARING THEM

This application is a continuation application of application Ser. No. 863,059, filed Apr. 3, 1992.

The invention concerns a new gallium phosphate and its substituted derivatives, and a method of preparing them.

Molecular sieves (crystallised microporous solids) have been known for many years. They are generally divided into two families:

1. zeolites (alumina silicates) and 2. other molecular sieves which are not alumina silicates ("quasi zeolite" solids). The second category of molecular sieves includes crystallised alumino phosphate compounds (see e.g. US-A-4310440) and microporous gallium phosphates (see e.g. EP-A-226 219).

Patent EP-A-22621 describes two types of crystallised microporous gallium phosphates with molecular sieve properties. These products are of the following general formula:

$$mR:Ga_2O_3:(1\pm0.2)P_2O_5: nH_2O$$

where R represents an organic structuring agent, an amine or quaternary ammonium, located in the channels of the crystallised solid, m and n respectively represent the number of moles of R and $H_2O$ per mole of $Ga_2O_3$. The Ga/P molar ratio of these solids is virtually 1/1. The positive $PO_2^+$ charge associated with phosphorus in the tetrahedra is compensated for by the negative $GaO_2^-$ charge associated with gallium in tetrahedral coordination in the crystallised framework.

After a calcination stage to eliminate organic species, the two gallium phosphates described in patent EP-A-226 219 may be used as adsorbents and catalysts.

Other crystallised microporous gallium phosphates have been described in the articles "Some gallium phosphates frameworks related to the aluminium phosphate molecular sieves: X-ray structural characterisation of {(i-PrNH$_3$)[Ga$_4$(PO$_4$)$_4$OH]}.H$_2$O" by J. P. Parise, J. Chem. Soc., Chem. Comm., 1965, pages 606–607, and "Studies on the synthesis and structures of a novel family of microporous gallophosphates" by Feng Shouhua and Xu Ruren, Chemical Journal of Chinese Universities, 1987, vol. 8, pages 867–868.

The invention concerns a new crystallised microporous gallium phosphate and its substituted derivatives, and a method of synthesising said gallium phosphate and its substituted derivatives.

The new gallium phosphate and its substituted derivatives according to the invention are characterised by:

a) the following approximate general formula:

$$R_rGa_gP_pX_xO_2F_f hH_2O$$

where the sum of g, p and x is equal to 1.
- g is a number from 0.3 to 0.5, preferably from 0.4 to 0.5,
- p is a number from 0.3 to 0.52,
- x is a number from 0 to 0.4, preferably from 0 to 0.2,
- r is a number from 0.01 to 0.2,
- f is a number from 0.01 to 0.2,
- h varies according to the degree of hydration of the solid, from 0 to 0.5.
- R is an organic compound selected from the group formed by cyclic amines, preferably quinuclidine,
- X is a heteroatom selected from the group formed by the elements: Li, Be, Co, Mg, Mn, Zn, Al, B, Cr, Fe, Ge, Si, Ti, As and V, preferably Si.

b) an X-ray diffraction diagram shown in Table 1.

They are also characterised in that they have been synthesised in a fluoride medium.

The invention also concerns a method of preparing said gallium phosphate and its substituted derivatives, comprising:

a) forming a reaction mixture containing at least the following compounds: water, at least one gallium source, at least one phosphorus source, possibly at least one source of a heteroatom X selected from the group formed by the elements: Li, Be, Co, Mg, Mn, Zn, Al, B, Cr, Fe, Ge, Si, Ti, As and V, preferably Si, at least one source of at least one organic compound, at least one source of fluoride anions and possibly at least one source of at least one acid or basic compound to adjust the pH of the reaction medium to the desired value, the pH of the reaction medium being from 3 to 8 and the reaction mixture being of the following composition in terms of the molar ratio:

$$r'R:Ga_2O_3:p'P_2O_5: x'XO_{n/2}: f'F:h'H_2O$$

where r' is a number from 1 to 10, preferably 5 to 10, where p' is a number from 0.3 to 1, preferably 0.5 to 1, where x' is a number from 0 to 1.5, preferably from 0 to 1, where f' is a number from 0.1 to 4, preferably from 0.3 to 2, where h' is a number from 1 to 500, preferably from 30 to 100, where R is an organic compound selected from the group formed by cyclic amines, preferably quinuclidine, where n is the degree of oxidation of the heteroatom X, b) and keeping the reaction mixture at a heating temperature above 40° C. until a crystalline compound is obtained.

The fluoride anions may be introduced in the form of hydrofluoric acid or salts thereof. These salts are formed with alkali metals, ammonium or preferably with the organic compound used. In this last case the salt is advantageously formed in the reaction mixture through reaction between the organic compound and hydrofluoric acid. It is also possible to use hydrolysable compounds which can liberate fluoride anions in water, such as ammonium fluorosilicate $(NH_4)_2SiF_6$ or sodium fluorosilicate $Na_2SiF_6$; silicon tetrafluoride $SiF_4$ is preferably used.

The organic compound is a cyclic amine. Quinuclidine is preferably used.

The gallium sources which may be used include gallium oxides and hydroxides such as GaOOH, gallium alkoxides of the formula $Ga(OR_1)_3$, where $R_1$ is an alkyl radical, or gallium salts such as gallium fluoride, gallium phosphate or gallium sulphate. It is preferable to use gallium sulphate.

Many sources of heteroatoms may be employed. Thus, in the case of silicon one can use a hydrogel, an aerogel or a colloidal suspension, precipitation oxides, oxides emanating from hydrolysis of esters such as ethyl orthosilicate Si(OEt)$_4$ or oxides emanating from hydrolysis of complexes such as ammonium fluorosilicate (NH$_4$)$_2$SiF$_6$ or sodium fluorosilicate Na$_2$SiF$_6$.

The preferred phosphorus source is phosphoric acid H$_3$PO$_4$, but its salts and esters such as alkali metal phosphates, gallium phosphate or alkyl phosphates are also suitable.

The acids or acid salts, bases or basic salts which may serve to adjust the pH of the reaction medium to the desired value may be selected from the usual acids, such as hydrochloric, sulphuric, nitric or acetic acid, acid salts such as ammonium hydrogen fluoride or sodium hydrogen sulphate, commonly used bases such as ammonia or sodium hydroxide and nitrogen bases such as methylamine. Buffer mixtures such as the acetate (acetic acid—sodium acetate) buffer or the ammoniacal (ammonia—ammonium chloride) are also appropriate.

The first stage in the synthesising method of the invention comprises forming the reaction mixture including water, a gallium source, the phosphorus source, possibly the source of the heteroatom X, the fluoride anion source, the organic compound, possibly an additional cation source to compensate for the charges in the framework, and possibly at least one acid or basic compound. The organic compound and the acid or basic compound are generally added last, to enable the pH to be adjusted to the desired value.

The second stage comprises crystallising the reaction mixture formed during the first stage. This is done by heating the reaction mixture to a temperature from 40° to 250° C., preferably from 60° to 220° C. under autogenous pressure. It is preferable to use a sealed polypropylene receptacle or an autoclave coated internally with a polymeric material, generally polytetrafluoroethylene, for temperatures below 100° C. and above 100° C. respectively.

The heating time for the reaction mixture required for crystallisation depends on the composition of the mixture and the reaction temperature.

The size and kinetics of crystal formation may be modified by placing nuclei in the reaction mixture, the nuclei being formed by possibly ground crystals of gallium phosphate and its substituted derivatives according to the invention, and by agitating during crystallisation.

After crystallisation the microporous crystallised gallium phosphate is separated from the mother liquor by filtration or centrifuging, washed with distilled water and dried in air at 40° C. The solid thus obtained contains the organic compound incorporated in the reaction mixture, occluded in its cavities. This compound is firstly associated with fluoride, and secondly acts as a cation to compensate for the negative charge of the framework resulting from incorporation of the heteroatom X in the crystallised framework. In addition to the organic compound, the gallium phosphate according to the invention may contain hydration water in its cavities, and inorganic compensating cations if the number of organic cations is insufficient. The solid according to the invention may be dehydrated by heating it to 150° C.

The gallium phosphate and its substituted derivatives thus prepared according to the invention may be cleared of the organic compounds present in the cavities after the synthesising stage, by calcining treatment at a temperature above 200° C. and preferably from 350°–450° C.

The microporous crystallised gallium phosphate according to the invention is conveniently identified from its X-ray diffraction diagram. The diagram is obtained with a diffractometer, using the conventional powder method with K$\alpha$ radiation of copper. From the position of the diffraction peaks represented by the angle 2 $\theta$, the reticular equidistances $d_{hkl}$ characteristic of the sample are calculated by the Bragg equation. The estimated measuring error $\Delta(d_{hkl})$ about $d_{hkl}$ is calculated as a function of the absolute $\Delta(2\theta)$ assigned to the measurement of $2\theta$ by the Bragg equation. An absolute error $\Delta(2\theta)$ of $\pm 0.05°$ is commonly accepted. The intensity $I_{rel}$ assigned to each value of $d_{hkl}$ is measured according to the height of the corresponding diffraction peak. The interpretation of the X-ray diffraction diagram given in Table 1 of this description is representative of the diffraction diagram for gallium phosphate and its substituted derivatives according to the invention.

TABLE 1

| $2\theta(°)$ | $d_{hkl}(\text{Å})$ | $I_{rel}$ |
|---|---|---|
| 3.4–3.6 | 25.9–24.5 | ml–m |
| 4.7–4.9 | 18.7–18.0 | l–ml |
| 5.9–6.1 | 14.9–14.4 | ml–m |
| 6.8–7.0 | 12.9–12.6 | l–ml |
| 7.4–7.6 | 11.9–11.6 | vl–l |
| 8.2–8.3 | 10.7–10.6 | ml–m |
| 8.3–8.6 | 10.6–10.5 | vl–l |
| 9.6–9.8 | 9.7–9.2 | vh |
| 10.1–10.3 | 8.75–8.58 | m–h |
| 11.3–11.5 | 7.82–7.68 | vl–l |
| 11.8–12 | 7.49–7.36 | ml–mh |
| 12.3–12.5 | 7.18–7.07 | vl–l |
| 12.8–13.0 | 6.91–6.80 | vl–l |
| 13.6–13.8 | 6.50–6.41 | l–ml |
| 14–14.2 | 6.32–6.23 | m–mh |
| 14.4–14.6 | 6.14–6.06 | vl–l |
| 15.2–15.4 | 5.82–5.74 | vl–l |
| 15.6–15.8 | 5.67–5.60 | vl–l |
| 16–16.2 | 5.53–5.46 | vl–l |
| 16.7–16.9 | 5.30–5.24 | vl–l |
| 17–17.2 | 5.21–5.15 | vl–l |
| 17.4–17.6 | 5.09–5.03 | vl–l |
| 17.7–17.9 | 5.00–4.95 | vl–l |
| 18.4–18.6 | 4.81–4.76 | l–ml |
| 18.7–18.9 | 4.74–4.69 | vl–l |
| 19.4–19.6 | 4.57–4.52 | vl–l |
| 19.6–19.8 | 4.52–4.48 | vl–l |
| 20.5–20.7 | 4.32–4.28 | ml–mh |
| 20.8–21.0 | 4.26–4.22 | vl–l |
| 21.1–21.3 | 4.20–4.16 | l–ml |
| 21.4–21.6 | 4.14–4.11 | vl–l |
| 21.7–21.9 | 4.09–4.05 | vl–l |
| 22.0–22.2 | 4.03–4.00 | vl–l |
| 22.3–22.4 | 3.98–3.95 | vl–l |
| 22.4–22.6 | 3.95–3.93 | vl–l |
| 22.7–22.9 | 3.91–3.88 | vl–l |
| 23.0–23.2 | 3.86–3.83 | vl–l |
| 23.3–23.5 | 3.81–3.78 | vl–l |
| 23.9–24.1 | 3.71–3.68 | l–ml |
| 24.2–24.4 | 3.67–3.64 | l–ml |
| 24.5–24.7 | 3.63–3.60 | l–ml |
| 24.8–25.0 | 3.58–3.55 | l–ml |
| 25.0–25.2 | 3.55–3.53 | vl–l |
| 25.3–25.5 | 3.51–3.49 | vl–l |
| 25.6–25.8 | 3.47–3.45 | vl–l |
| 25.9–26.1 | 3.43–3.41 | l–ml |
| 26.4–26.6 | 3.37–3.34 | l–ml |
| 27.1–27.2 | 3.29–3.27 | l–ml |
| 27.6–27.8 | 3.22–3.20 | vl–l |
| 27.9–28.10 | 3.19–3.17 | vl–l |
| 28.4–28.6 | 3.13–3.11 | l–ml |
| 28.7–28.9 | 3.10–3.08 | ml–mh |
| 29.2–29.4 | 3.05–3.03 | vl–l |
| 29.6–29.8 | 3.01–2.995 | vl–l |
| 30.2–30.4 | 2.956–2.937 | vl–l |
| 30.5–30.7 | 2.928–2.909 | vl–l |

TABLE 1-continued

| 2θ(°) | $d_{hkl}$(Å) | $I_{rel}$ |
| --- | --- | --- |
| 31.0–31.2 | 2.882–2.864 | l–ml |
| 32.0–32.2 | 2.794–2.777 | vl–l |
| 32.7–32.9 | 2.736–2.720 | vl–l |
| 33.3–33.5 | 2.688–2.672 | vl–l |
| 34.7–34.9 | 2.582–2.568 | vl–l |
| 35.4–35.6 | 2.533–2.519 | vl–l |
| 38.3–38.5 | 2.348–2.336 | vl–l |
| 43.1–43.3 | 2.096–2.087 | vl–l |
| 44.9–45.1 | 2.017–2.008 | vl–l |
| 48.0–48.2 | 1.893–1.886 | vl–l | vh: very high, h: high, mh: moderately high, m: moderate, ml: moderately low, l: low, vl: very low The gallium phosphate and its substituted derivatives according to the invention may be used as adsorbents and catalysts.

The following examples illustrate the invention but without restricting its scope.

EXAMPLE 1

6.5 g of hydrated gallium sulphate is dissolved in 8.5 g of l0 distilled water (the $H_2O/Ga_2(SO_4))_3$ molar ratio in the salt is near 25). The sulphate is obtained by dissolving Johnson Matthey's grade 1 gallium hot in an excess of concentrated acid $H_2SO_4$, absorbing the resultant suspension with 60% ethanol in water at normal temperature, re-precipitating the hydrated gallium sulphate in this cooled solution by adding ether, then filtering and careful drying. 2.3 g of 85% phosphoric acid (Prolabo) is stirred in, then 0.2 g of 40% hydrofluoric acid (Fluka) and finally 6.6 g of quinuclidine (Aldrich), which will hereinafter be written as Q. Agitation is continued for about 15 minutes. The pH of the resultant reaction mixture is 5.

The composition of the reaction mixture is then as follows:

$$6Q:1Ga_2O_3:1P_2O_5:0.4HF:64H_2O$$

The reaction mixture is transferred to an autoclave lined with polytetrafluoroethylene and is heated at 140° C. for 24 hours. When the solid has been cooled it is filtered, washed with distilled water and dried at about 40° C. Analysis of the solid by X-ray diffraction shows it to be a phase of cubic crystalline structure, for which the X-ray diffraction diagram is identical with that in Table 1 of this specification.

Chemical analysis of the solid gives the following composition (as a percentage) by weight:

C:10.44;N:1.65;F:2.20;Ga:29.0;P:13.82

The corresponding chemical formula for the anhydrous form is as follows:

$$Q_{0.14}Ga_{0.48}P_{0.52}O_2F_{0.13}$$

EXAMPLE 2

This example illustrates the essential part played by fluoride ions in the synthesising medium in obtaining microporous crystallised gallium phosphate and its substituted derivatives according to the invent ion.

A test is carried out in the absence of fluoride ions, under the same conditions as in example 1.

Observation of the crystallised solid obtained with an optical microscope and an electron microscope with scanning (EMS) shows hexagonal prismatic crystals of about 80 micrometers. The X-ray diffraction diagram obtained is similar to that in patent EP-A-226219.

EXAMPLE 3

6.5 g of hydrated gallium sulphate are dissolved in 8.5 g of distilled water. 2.31 g of phosphoric acid (85% solution) are stirred in, then 0.5 g of HF (40% solution) and finally 6.6 g of quinuclidine. The pH of the homogenised reaction mixture is 4.5.

The composition of the reaction mixture is as follows:

$$6Q:1Ga_2O_3:1P_2O_5:1HF:64H_2O$$

The reaction mixture is transferred to an autoclave similar to that in example 1, then heated at 150° C. for 24 hours. The solid obtained is filtered, washed with distilled water and dried at 40° C.

Observation of the solid obtained through a microscope with scanning shows crystals in the form of cubes with truncated vertices with 1 to 2 micrometer edges.

Chemical analysis of the solid gives the following composition (as a percentage) by weight:

C:9.06;N:1.54;F:2.22;Ga:31.44;P:14.63

The corresponding chemical formula for the anhydrous form is as follows:

$$Q_{0.12}Ga_{0.49}P_{0.51}O_2F_{0.13}$$

The X-ray diffraction diagram for the solid obtained is identical with that in table 1 of this specification.

Weight losses, measured by thermal gravimetric analysis through heating in a stream of nitrogen to 450° C., are as follows:

$H_2O$:10%; quinuclidine+F:20%

The adsorption capacity of various molecules is determined by means of an electric balance from the sample calcined in situ. A first stage of heating is carried out at reduced pressure (1 millibar) at 450° C. for 3 hours. The sample is then cooled to 100° C. at 10° C. per minute after which the chamber is filled with dry oxygen and the temperature brought back to 450° C. at 5° C. per minute. The solid is kept at 450° C. for about 1 hour then cooled to room temperature in a stream of dry oxygen. The adsorption capacities of the calcined solid are as follows:

| | $P/P_o$ | T (°C.) | quantity adsorbed by weight (%) |
| --- | --- | --- | --- |
| n-hexane | 0.5 | 29 | 10.05 |
| p-xylene | 0.9 | 27 | 10.95 |
| mesitylene | 0.9 | 35 | 4.63 |
| tri-isopropylbenzene | 0.9 | 25 | 5.29 |

EXAMPLE 4

The procedure is the same as in example 1 except that the reaction mixture is heated at 150° C. for 15 hours. Observation with an electron microscope with scanning shows cubes with truncated vertices with 50–80 micrometer edges.

The X-ray diffraction diagram for the solid is identical with that in table 1 of this specification.

EXAMPLE 5

A reaction mixture of the same composition of that in example 1 is heated at 220° C. for 7 hours. Observation of the solid obtained with an electron microscope shows cubic crystals with 1 to 3 micrometer edges.

The X-ray diffraction diagram for the solid obtained is identical with that in table 1 of this specification.

EXAMPLE 6

Preparation of a silico-gallophosphate.

A source of combustion silica marketed by Degussa under the name of Aerosil is used in this preparation process.

The sources of gallium, phosphorus, fluoride and organic compound are the same as those used in example 1.

6.5 g of hydrated gallium sulphate is dissolved in 8.5 g of distilled water, and 0.36 g of Aerosil silica then 6.66 g of quinuclidine are added. 2.31 g of phosphoric acid and 0.5 g of hydrofluoric acid are added to the preparation.

The chemical composition of the reaction mixture is then as follows:

$$6Q:1Ga_2O_3:1P_2O_5:0.6\ SiO_2:1HF:64H_2O$$

The reaction mixture obtained after agitation (pH=4.5) is placed in the same type of autoclave as before and brought to 150° C. for 24 hours.

After the reaction the fully crystallised solid is filtered, washed with distilled water and dried at 40° C. The X-ray diffraction spectrum corresponds to that in table 1 of this specification.

Chemical analysis of the solid gives the following formula, for the anhydrous form with the organic compound removed:

$$Ga_{0.5}P_{0.45}Si_{0.05}O_2$$

We claim:

1. A microporous crystallised gallium phosphate characterised by:

a) the following formula:

$$R_rGa_gP_pX_xO_2F_fhH_2O$$

where the sum of g, p and x is equal to 1
g is a number from 0.4 to 0.5,
p is a number from 0.38 to 0.5,
x is a number from 0 to 0.2,
r is a number from 0.01 to 0.2,
f is a number from 0.01 to 0.14,
h varies according to the degree of hydration of the solid, from 0 to 0.5,
R is quinuclidine,
X is a heteroatom selected from the group consisting of the elements: Li, Be, Co, Mg, Mn, Zn, Al, B, Cr, Fe, Ge, Si, Ti, As and V, and b) an X-ray diffraction diagram shown in Table 1:

| $2\theta(°)$ | $d_{hkl}(Å)$ | $I_{rel}$ |
|---|---|---|
| 3.4–3.6 | 25.9–24.5 | ml-m |
| 4.7–4.9 | 18.7–18.0 | l-ml |
| 5.9–6.1 | 14.9–14.4 | ml-m |
| 6.8–7.0 | 12.9–12.6 | l-ml |
| 7.4–7.6 | 11.9–11.6 | vl-l |
| 8.2–8.3 | 10.7–10.6 | ml-m |
| 8.3–8.6 | 10.6–10.5 | vl-l |
| 9.6–9.8 | 9.7–9.2 | vh |
| 10.1–10.3 | 8.75–8.58 | m-h |
| 11.3–11.5 | 7.82–7.68 | vl-l |
| 11.8–12 | 7.49–7.36 | ml-mh |
| 12.3–12.5 | 7.18–7.07 | vl-l |
| 12.8–13.0 | 6.91–6.80 | vl-l |
| 13.6–13.8 | 6.50–6.41 | l-ml |
| 14–14.2 | 6.32–6.23 | m-mh |
| 14.4–14.6 | 6.14–6.06 | vl-l |
| 15.2–15.4 | 5.82–5.74 | vl-l |
| 15.6–15.8 | 5.67–5.60 | vl-l |
| 16–16.2 | 5.53–5.46 | vl-l |
| 16.7–16.9 | 5.30–5.24 | vl-l |
| 17–17.2 | 5.21–5.15 | vl-l |
| 17.4–17.6 | 5.09–5.03 | vl-l |
| 17.7–17.9 | 5.00–4.95 | vl-l |
| 18.4–18.6 | 4.81–4.76 | l-ml |
| 18.7–18.9 | 4.74–4.69 | vl-l |
| 19.4–19.6 | 4.57–4.52 | vl-l |
| 19.6–19.8 | 4.52–4.48 | vl-l |
| 20.5–20.7 | 4.32–4.28 | ml-mh |
| 20.8–21.0 | 4.26–4.22 | vl-l |
| 21.1–21.3 | 4.20–4.16 | l-ml |
| 21.4–21.6 | 4.14–4.11 | vl-l |
| 21.7–21.9 | 4.09–4.05 | vl-l |
| 22.0–22.2 | 4.03–4.00 | vl-l |
| 22.3–22.4 | 3.98–3.95 | vl-l |
| 22.4–22.6 | 3.95–3.93 | vl-l |
| 22.7–22.9 | 3.91–3.88 | vl-l |
| 23.0–23.2 | 3.86–3.83 | vl-l |
| 23.3–23.5 | 3.81–3.78 | vl-l |
| 23.9–24.1 | 3.71–3.68 | l-ml |
| 24.2–24.4 | 3.67–3.64 | l-ml |
| 24.5–24.7 | 3.63–3.60 | l-ml |
| 24.8–25.0 | 3.58–3.55 | l-ml |
| 25.0–25.2 | 3.55–3.53 | vl-l |
| 25.3–25.5 | 3.51–3.49 | vl-l |
| 25.6–25.8 | 3.47–3.45 | vl-l |
| 25.9–26.1 | 3.43–3.41 | l-ml |
| 26.4–26.6 | 3.37–3.34 | l-ml |
| 27.1–27.2 | 3.29–3.27 | l-ml |
| 27.6–27.8 | 3.22–3.20 | vl-l |
| 27.9–28.10 | 3.19–3.17 | vl-l |
| 28.4–28.6 | 3.13–3.11 | l-ml |
| 28.7–28.9 | 3.10–3.08 | ml-mh |
| 29.2–29.4 | 3.05–3.03 | vl-l |
| 29.6–29.8 | 3.01–2.995 | vl-l |
| 30.2–30.4 | 2.956–2.937 | vl-l |
| 30.5–30.7 | 2.928–2.909 | vl-l |
| 31.0–31.2 | 2.882–2.864 | l-ml |
| 32.0–32.2 | 2.794–2.777 | vl-l |
| 32.7–32.9 | 2.736–2.720 | vl-l |
| 33.3–33.5 | 2.688–2.672 | vl-l |
| 34.7–34.9 | 2.582–2.568 | vl-l |
| 35.4–35.6 | 2.533–2.519 | vl-l |
| 38.3–38.5 | 2.348–2.336 | vl-l |
| 43.1–43.3 | 2.096–2.087 | vl-l |
| 44.9–45.1 | 2.017–2.008 | vl-l |
| 48.0–48.2 | 1.893–1.886 | vl-l | wherein vh: very high, h: high, mh: moderately high, m: moderate, ml: moderately low, l: low, vl: very low.

2. Microporous crystallised gallium phosphate according to claim 1, for which the heteroatom X is silicon.

3. A microporous crystallised gallium phosphate characterised by:

a) the following formula:

$$R_rGa_gP_pX_xO_2F_fhH_2O$$

where the sum of g, p and x is equal to 1,
g is a number from 0.4 to 0.5,
p is a number from 0.38 to 0.5,
x is a number from 0 to 0.2,
r is a number from 0.01 to 0.2, f is a number from 0.01 to 0.14, h varies, according to the degree of hydration of the solid, from 0 to 0.5, R is an organic compound selected from the group consisting of cyclic amines wherein one nitrogen atom is part of a saturated ring structure having one or two rings with remaining ring atoms being carbon, X is a heteroatom selected from the group consisting of the elements Li, Be, Co, Mg, Mn, Zn, Al, B, Cr, Fe, Ge, Si, Ti, As and V, and b) an X-ray diffraction diagram shown in Table 1:

| $2\theta(°)$ | $d_{hkl}(\text{Å})$ | $I_{rel}$ |
|---|---|---|
| 3.4–3.6 | 25.9–24.5 | ml–m |
| 4.7–4.9 | 18.7–18.0 | l–ml |
| 5.9–6.1 | 14.9–14.4 | ml–m |
| 6.8–7.0 | 12.9–12.6 | l–ml |
| 7.4–7.6 | 11.9–11.6 | vl–l |
| 8.2–8.3 | 10.7–10.6 | ml–m |
| 8.3–8.6 | 10.6–10.5 | vl–l |
| 9.6–9.8 | 9.7–9.2 | vh |
| 10.1–10.3 | 8.75–8.58 | m–h |
| 11.3–11.5 | 7.82–7.68 | vl–l |
| 11.8–12 | 7.49–7.36 | ml–mh |
| 12.3–12.5 | 7.18–7.07 | vl–l |
| 12.8–13.0 | 6.91–6.80 | vl–l |
| 13.6–13.8 | 6.50–6.41 | l–ml |
| 14–14.2 | 6.32–6.23 | m–mh |
| 14.4–14.6 | 6.14–6.06 | vl–l |
| 15.2–15.4 | 5.82–5.74 | vl–l |
| 15.6–15.8 | 5.67–5.60 | vl–l |
| 16–16.2 | 5.53–5.46 | vl–l |
| 16.7–16.9 | 5.30–5.24 | vl–l |
| 17–17.2 | 5.21–5.15 | vl–l |
| 17.4–17.6 | 5.09–5.03 | vl–l |
| 17.7–17.9 | 5.00–4.95 | vl–l |
| 18.4–18.6 | 4.81–4.76 | l–ml |
| 18.7–18.9 | 4.74–4.69 | vl–l |
| 19.4–19.6 | 4.57–4.52 | vl–l |
| 19.6–19.8 | 4.52–4.48 | vl–l |
| 20.5–20.7 | 4.32–4.28 | ml–mh |
| 20.8–21.0 | 4.26–4.22 | vl–l |
| 21.1–21.3 | 4.20–4.16 | l–ml |
| 21.4–21.6 | 4.14–4.11 | vl–l |
| 21.7–21.9 | 4.09–4.05 | vl–l |
| 22.0–22.2 | 4.03–4.00 | vl–l |
| 22.3–22.4 | 3.98–3.95 | vl–l |
| 22.4–22.6 | 3.95–3.93 | vl–l |
| 22.7–22.9 | 3.91–3.88 | vl–l |
| 23.0–23.2 | 3.86–3.83 | vl–l |
| 23.3–23.5 | 3.81–3.78 | vl–l |
| 23.9–24.1 | 3.71–3.68 | l–ml |
| 24.2–24.4 | 3.67–3.64 | l–ml |
| 24.5–24.7 | 3.63–3.60 | l–ml |
| 24.8–25.0 | 3.58–3.55 | l–ml |
| 25.0–25.2 | 3.55–3.53 | vl–l |
| 25.3–25.5 | 3.51–3.49 | vl–l |
| 25.6–25.8 | 3.47–3.45 | vl–l |
| 25.9–26.1 | 3.43–3.41 | l–ml |
| 26.4–26.6 | 3.37–3.34 | l–ml |
| 27.1–27.2 | 3.29–3.27 | l–ml |
| 27.6–27.8 | 3.22–3.20 | vl–l |
| 27.9–28.10 | 3.19–3.17 | vl–l |
| 28.4–28.6 | 3.13–3.11 | l–ml |
| 28.7–28.9 | 3.10–3.08 | ml–mh |
| 29.2–29.4 | 3.05–3.03 | vl–l |
| 29.6–29.8 | 3.01–2.995 | vl–l |
| 30.2–30.4 | 2.956–2.937 | vl–l |
| 30.5–30.7 | 2.928–2.909 | vl–l |
| 31.0–31.2 | 2.882–2.864 | l–ml |
| 32.0–32.2 | 2.794–2.777 | vl–l |
| 32.7–32.9 | 2.736–2.720 | vl–l |
| 33.3–33.5 | 2.688–2.672 | vl–l |
| 34.7–34.9 | 2.582–2.568 | vl–l |
| 35.4–35.6 | 2.533–2.519 | vl–l |
| 38.3–38.5 | 2.348–2.336 | vl–l |
| 43.1–43.3 | 2.096–2.087 | vl–l |
| 44.9–45.1 | 2.017–2.008 | vl–l |
| 48.0–48.2 | 1.893–1.886 | vl–l | wherein vh: very high, h: high, mh: moderately high, m: moderate, ml: moderately low, l: low, vl: very low.

4. A method of preparing microporous crystalline gallium phosphate according to claim 1, characterised in that:

a) a reaction mixture is formed containing at least the following compounds: water, at least one gallium (3) source, at least one phosphorus source, at least one source of a heteroatom X selected from the group consisting of the elements: Li, Be, Co, Mg, Mn, Zn, Al, B, Cr, Fe, Ge, Si, Ti, As and V, quinuclidine at least one source of fluoride anions, the pH of the reaction medium from 3 to 8 and the reaction mixture being of the following composition in terms of the molar ratio:

where r' is a number from 1 to 10, where p' is a number from 0.3 to 1, where x' is a number from 0 to 1.5, where f' is a number from 0.1 to 4, where h' is a number from 1 to 500, where R is quinuclidine where n is a degree of oxidation of the heteroatom X, b) and the reaction mixture is kept at a heating temperature above 40° C. until a crystalline compound is obtained.

5. A method according to claim 4, wherein at stage a) the reaction mixture is of the following composition in terms of the molar ratio:

where r' is a number from 5 to 10, where p' is a number from 0.5 to 1, where x' is a number from 0 to 1, where f' is a number from 0.3 to 2, where h' is a number from 30 to 100, 6. A method according to claim 4 or 5 wherein, after stage b), a calcining treatment of the solid is carried out at a temperature above 200° C.

7. A method according to claim 4 or 5, wherein X is silicon.

8. A method according to claim 4 or 5, wherein, at stage b), the reaction mixture is kept at a heating temperature from 40°–250° C. until a crystalline compound is obtained.

9. A method according to claim 4 or 5 wherein, at stage b), the reaction mixture is kept at a heating temperature from 60°–220° C. until a crystalline compound is obtained.

10. A method according to claim 9 wherein, after stage b), a calcining treatment of the solid is carried out at a temperature above 200° C.

11. A method according to claim 8 wherein, after stage b), a calcining treatment of the solid is carried out at a temperature above 200° C.

12. A method according to claim 7 wherein, after stage b), a calcining treatment of the solid is carried out at a temperature above 200° C.

13. A method according to claim 7 wherein, at stage b), the reaction mixture is kept at a heating temperature from 40°–250° C. until a crystalline compound is obtained.

14. A method of preparing a microporous crystallised gallium phosphate according to claim 3, characterised in that:

a) a reaction mixture is formed containing at least the following compounds: water, at least one gallium (3) source, at least one phosphorus source, at least one source of a heteroatom X selected from the group consisting of the elements: Li, Be, Co, Mg, Mn, Zn, Al, B, Cr, Fe, Ge, Si, Ti, As and V, at least one organic compound selected from the group consisting of cyclic amines where one nitrogen atom is part of a saturated ring structure having one or two rings with remaining atoms being carbon, and at least one source of fluoride anions, the pH of the reaction medium being from 3 to 8 and the reaction mixture being of the following composition in terms of the molar ratio:

$$r'R:Ga_2O_3:p'P_2O_5:x'XO_{n/2}:f'F:h'H_2O$$

wherein r' is a number from 1 to 10,
wherein p' is a number from 0.3 to 1,
wherein x' is a number from 0 to 1.5,
wherein f' is a number from 0.1 to 4,
wherein h' is a number from 1 to 500,
wherein R is the at least one organic compound, and
wherein n is a degree of oxidation of the heteroatom X; and b) and the reaction mixture is kept at a heating temperature above 40° C. until a crystalline compound is obtained.

15. A method according to claim 7 wherein, at stage b), the reaction mixture is kept at a heating temperature from 60°–220° C. until a crystalline compound is obtained.

* * * * *